(12) United States Patent
Ryu et al.

(10) Patent No.: US 12,517,477 B2
(45) Date of Patent: Jan. 6, 2026

(54) TEMPERATURE DISCRETIZATION DIGITAL DEVICE

(71) Applicant: KOREA ELECTROTECHNOLOGY RESEARCH INSTITUTE, Gyeongsangnam-do (KR)

(72) Inventors: Byungki Ryu, Gyeongsangnam-do (KR); Jaywan Chung, Gyeongsangnam-do (KR); Su-Dong Park, Gyeongsangnam-do (KR)

(73) Assignee: KOREA ELECTROTECHNOLOGY RESEARCH INSTITUTE, Gyeongsangnam-do (KR)

( * ) Notice: Subject to any disclaimer, the term of this patent is extended or adjusted under 35 U.S.C. 154(b) by 645 days.

(21) Appl. No.: 18/009,305

(22) PCT Filed: Jun. 11, 2021

(86) PCT No.: PCT/KR2021/007353
§ 371 (c)(1),
(2) Date: Dec. 8, 2022

(87) PCT Pub. No.: WO2021/251801
PCT Pub. Date: Dec. 16, 2021

(65) Prior Publication Data
US 2023/0259078 A1  Aug. 17, 2023

(30) Foreign Application Priority Data

Jun. 12, 2020 (KR) .................. 10-2020-0071807
Jun. 8, 2021 (KR) .................. 10-2021-0073841

(51) Int. Cl.
*G05B 13/04* (2006.01)
*G01K 7/00* (2006.01)
(Continued)

(52) U.S. Cl.
CPC ............ *G05B 13/042* (2013.01); *G01K 7/00* (2013.01); *H10N 10/17* (2023.02); *H10N 10/852* (2023.02)

(58) Field of Classification Search
CPC .... G05B 13/042; H10N 10/852; H10N 10/17; G01K 7/00
(Continued)

(56) References Cited

U.S. PATENT DOCUMENTS

| | | | |
|---|---|---|---|
| 7,347,621 B2 * | 3/2008 | Sri-Jayantha | G06F 1/206 374/111 |
| 7,366,997 B1 * | 4/2008 | Rahmat | G06F 30/367 716/120 |

(Continued)

FOREIGN PATENT DOCUMENTS

| | | | | |
|---|---|---|---|---|
| CN | 111367324 B | * | 2/2025 | ........... G05D 7/0617 |
| EP | 2533423 A1 | * | 12/2012 | ........... H03K 5/1534 |

(Continued)

*Primary Examiner* — Suresh Memula
(74) *Attorney, Agent, or Firm* — JCIPRNET

(57) ABSTRACT

The objective of the present invention is to provide a temperature discretization digital device capable of achieving thermalBIT, which controls the characteristic of bifurcation of a temperature solution of a thermoelectric heat equation by adjusting an internal calorific value control parameter such as a current/voltage/thermoelectric property coefficient, so as to cause numbers 0 and 1 to correspond to the numerical range of a temperature solution.

To this end, the present invention comprises a thermalBIT solution realizing material having a multi-temperature solution in a medium-sized current or voltage area, controls the characteristic of bifurcation of a temperature solution of a thermoelectric heat equation by adjusting an internal calorific value control parameter; and causes numbers 0 and 1 to
(Continued)

correspond to the numerical range of a multi-temperature solution so that thermalBIT is realized.

18 Claims, 14 Drawing Sheets

(51) Int. Cl.
  *H10N 10/17* (2023.01)
  *H10N 10/852* (2023.01)
(58) Field of Classification Search
  USPC ........................................................ 716/110
  See application file for complete search history.

(56) References Cited

U.S. PATENT DOCUMENTS

| | | | | |
|---|---|---|---|---|
| 8,286,111 | B2* | 10/2012 | Chandra | G01K 7/425 |
| | | | | 716/110 |
| 11,590,299 | B1* | 2/2023 | Good | A61M 15/008 |
| 12,298,422 | B2* | 5/2025 | Ross | G01C 21/206 |
| 2007/0124707 | A1* | 5/2007 | Sutjahjo | G06F 30/367 |
| | | | | 716/113 |
| 2008/0173342 | A1 | 7/2008 | Bell et al. | |
| 2009/0019411 | A1* | 1/2009 | Chandra | G06F 30/3312 |
| | | | | 716/119 |
| 2009/0024347 | A1 | 1/2009 | Chandra et al. | |
| 2009/0166794 | A1* | 7/2009 | Mowry | G01K 1/14 |
| | | | | 438/54 |
| 2013/0159956 | A1* | 6/2013 | Verghese | G06F 30/367 |
| | | | | 716/122 |
| 2013/0307713 | A1* | 11/2013 | Kawaguchi | H03M 1/50 |
| | | | | 341/166 |
| 2014/0105241 | A1 | 4/2014 | Vafai et al. | |
| 2014/0169410 | A1* | 6/2014 | Tanaka | G01S 19/37 |
| | | | | 375/148 |
| 2015/0040092 | A1* | 2/2015 | Reber | H01L 23/5226 |
| | | | | 716/119 |
| 2015/0248516 | A1* | 9/2015 | Hada | G06F 30/394 |
| | | | | 716/110 |
| 2016/0217247 | A1* | 7/2016 | Hada | G06F 30/23 |
| 2023/0195980 | A1* | 6/2023 | Macdonald | G06F 30/39 |
| | | | | 716/104 |
| 2025/0245323 | A1* | 7/2025 | Kirschner | G06F 21/554 |

FOREIGN PATENT DOCUMENTS

| | | | | |
|---|---|---|---|---|
| EP | 3329596 B1 * | 8/2020 | | H03K 5/26 |
| WO | 2019054990 | 3/2019 | | |
| WO | 2019136799 | 7/2019 | | |

* cited by examiner

FIG. 2
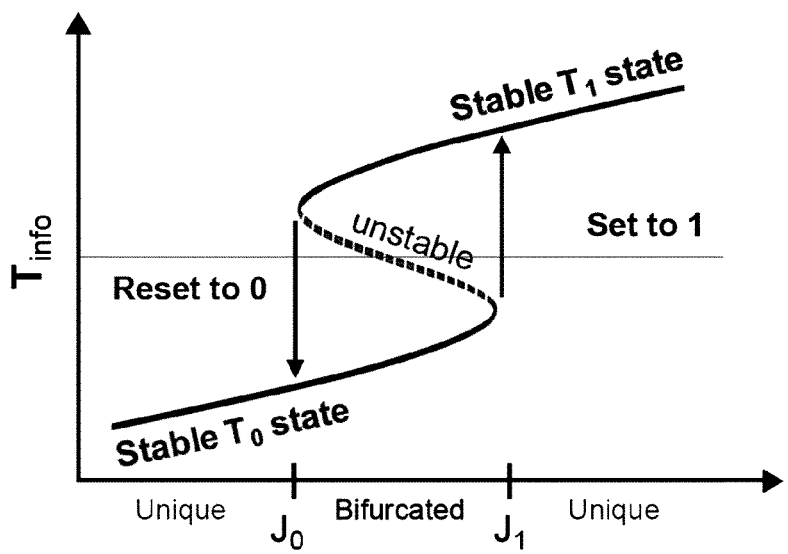
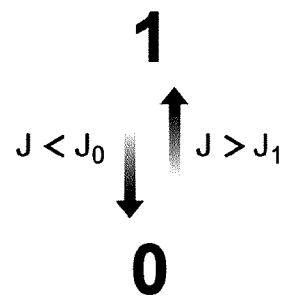

FIG. 4
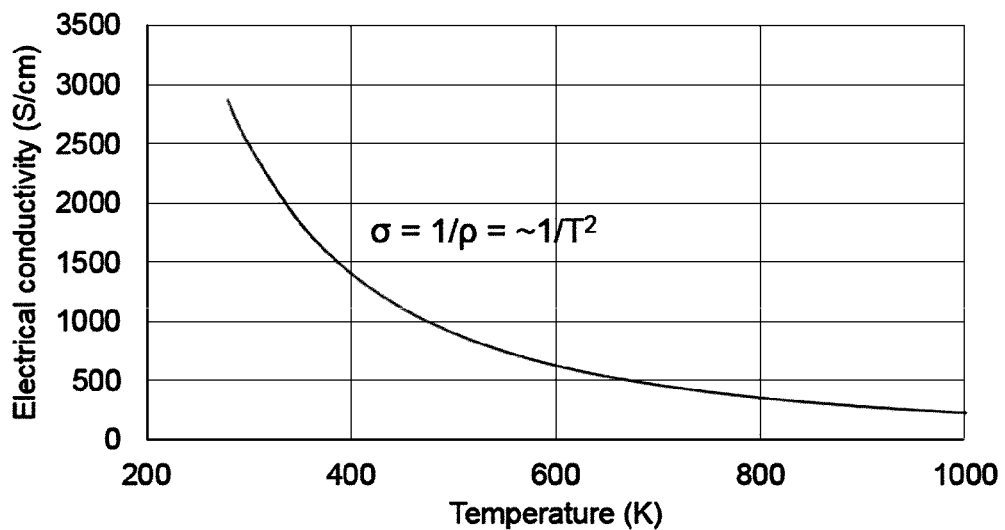
(a)
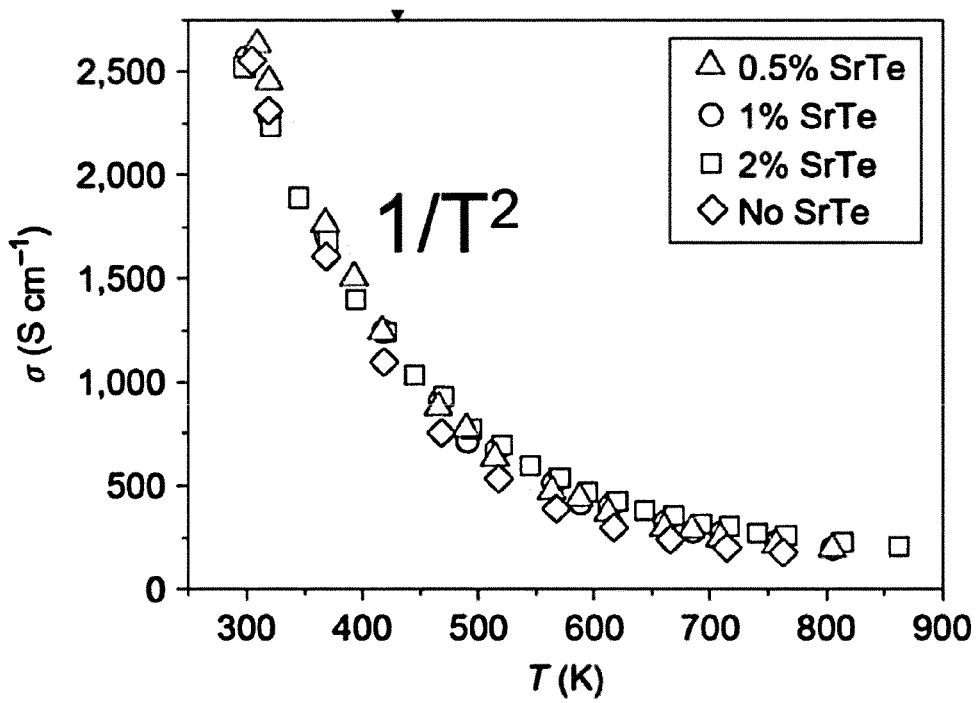
(b)

FIG. 5
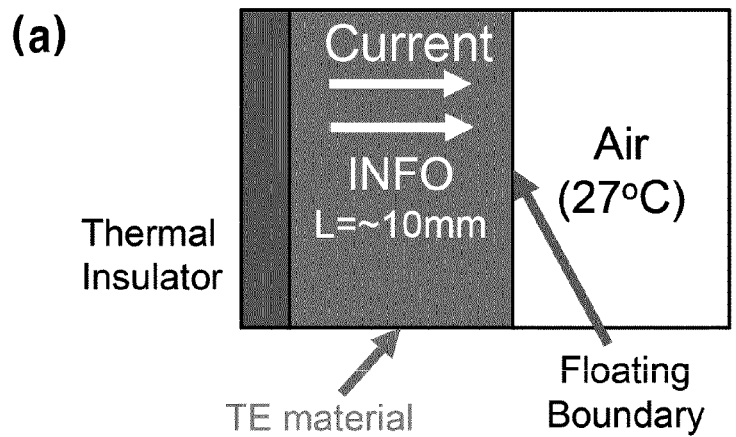
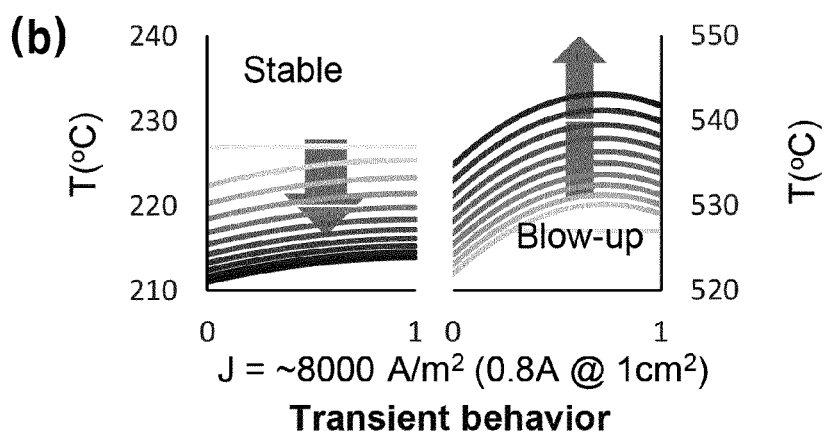
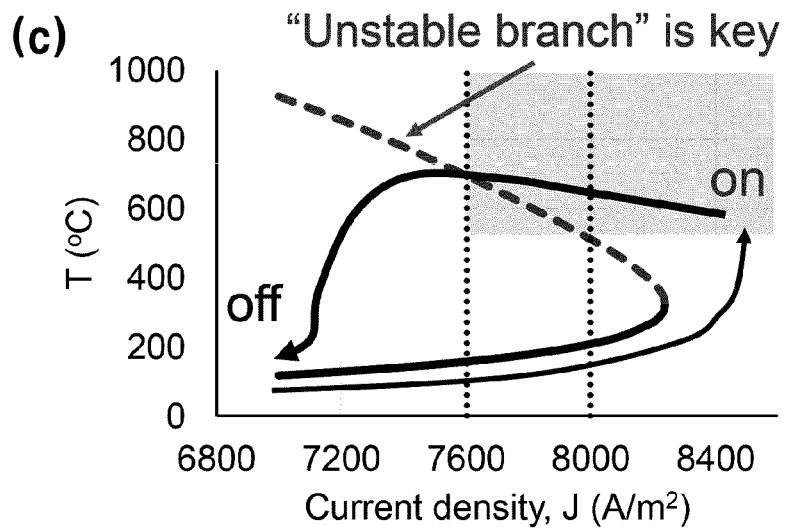

FIG. 7
Positive temperature coefficient (PTC) material case
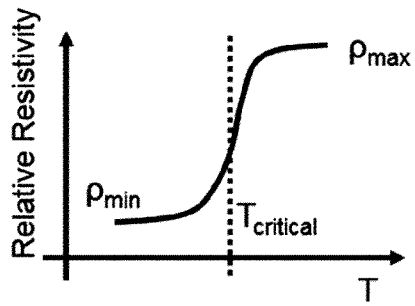
| Examples | $T_{critical}$ (K) | $\rho_{max}/\rho_{min}$ at ~$T_c$ |
|---|---|---|
| $BaTiO_3$ | ~400 | ~100 |
| GeTe | ~650 | ~1.05 |
| TAGS-85 | ~500 | ~1.05 |
| $Ag_2Te$ | ~400 | ~2 |
| $Cu_2Se$ | ~400 | ~2.5 |
| $Zn_4Sb_3$ | ~250 | ~2 |
| MgAgSb | ~600 | ~3 |
| SnSe | ~800 | ~50 |
Negative temperature coefficient (NTC) material case
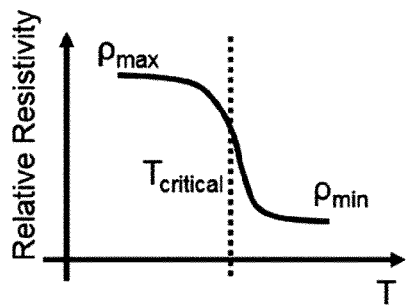
Exponential increasing conductivity
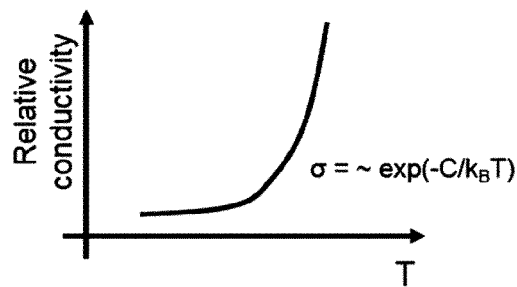

FIG. 8

Single-junction ThermalBIT

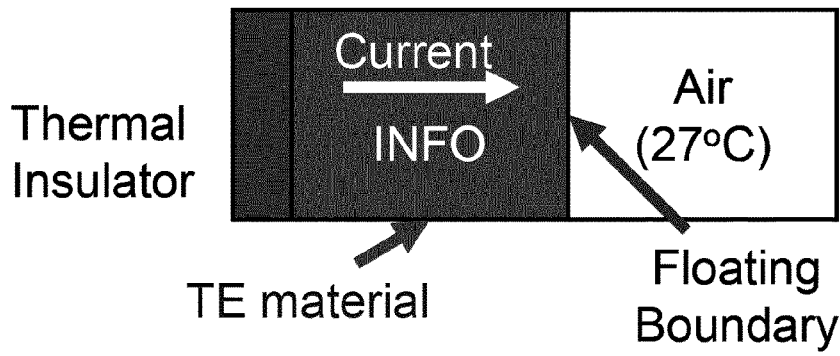

Thermal balancing Analysis $$Q_{ThermalBIT} = Q_{TE} + Q_{cooling}$$

J mode, with PTC* material ($\rho = \rho_o T^n$)

$$= J T(\alpha_p - \alpha_n) + L\rho_0 J^2 T^n - h(T - T_{ref})$$

V mode, with NTC** material ($\rho = \rho_o T^{-n}$)

$$= \frac{V}{\rho_o} T(\alpha_p - \alpha_n) + \frac{V^2}{\rho_o} T^n - h(T - T_{ref})$$

- TE heating vs cooling.
- Blow-up heating → unstable critical solution.
- Joule heating
- Thomson (Peltier) heat by Seebeck jump
- Three important parameters: n, $\rho_o$, h

FIG. 10

|  | Needed | Mechanism | Examples |
|---|---|---|---|
| Material | High R/K | Blow-up at INFO | Thermoelectric materials |
| Material | High $\|n\|>2$ | Electron scattering micro mechanism | PTC material, Operation mode: J control<br>NTC material, Operation mode: V control |
| Material | High $\rho_o$ | Prefactor rescaling | Macro composite, effective medium theory |
| Device | Low h | Passive cooling<br>Active cooling | $Q_{passive} = h\Delta T$ → Single-junction floating boundary<br>$Q_{active} = K\Delta T + I\alpha(T-\tau\Delta T) - (1/2) I^2 R (1+\beta)$ → Multi-junction fixed boundary |
| Junction | High $d\alpha/dx$ | Seebeck jump | Thermoelectric junction heat |

FIG. 11
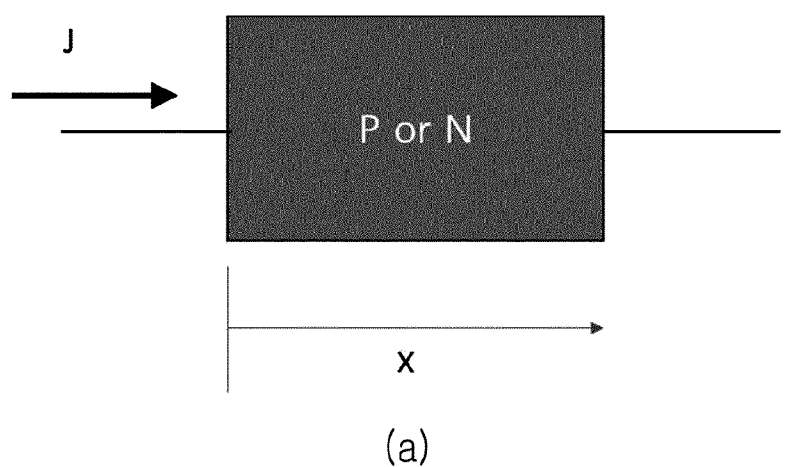
(a)
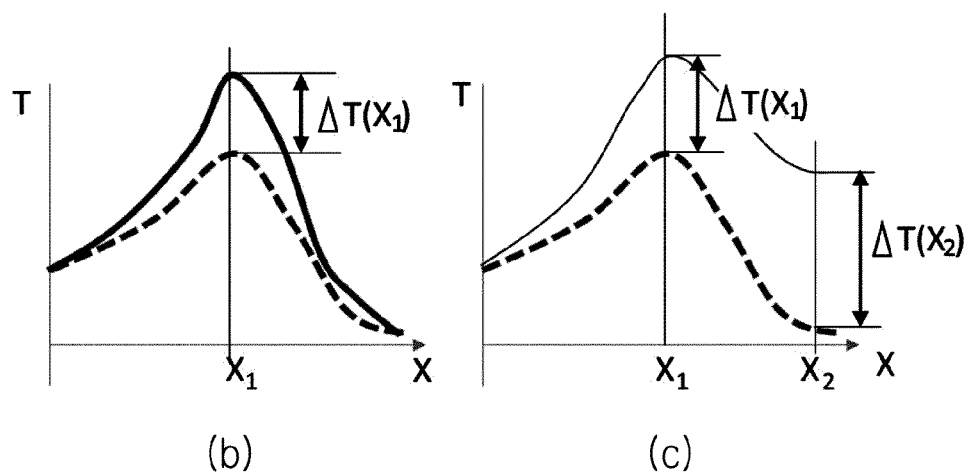
(b) (c)

FIG. 12
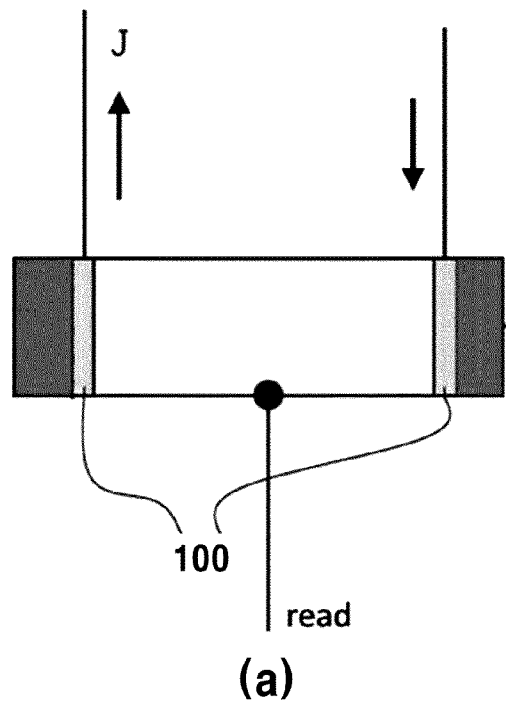
(a)
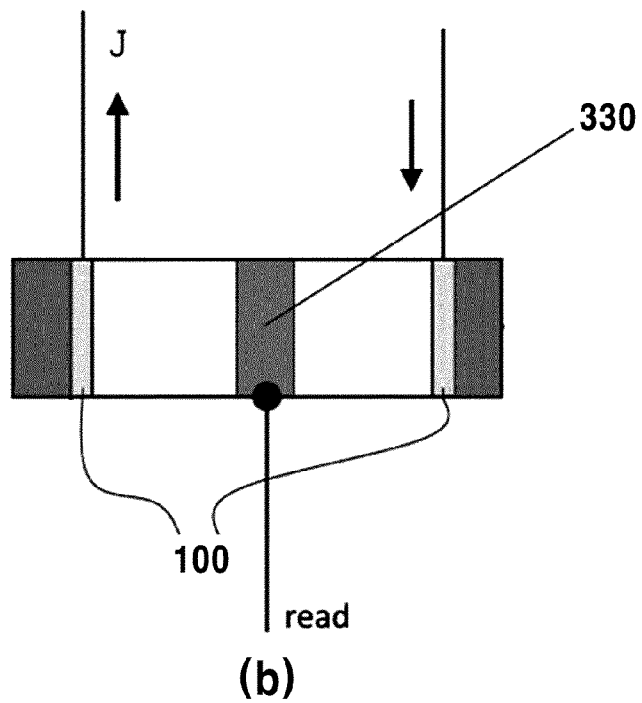
(b)

FIG. 13
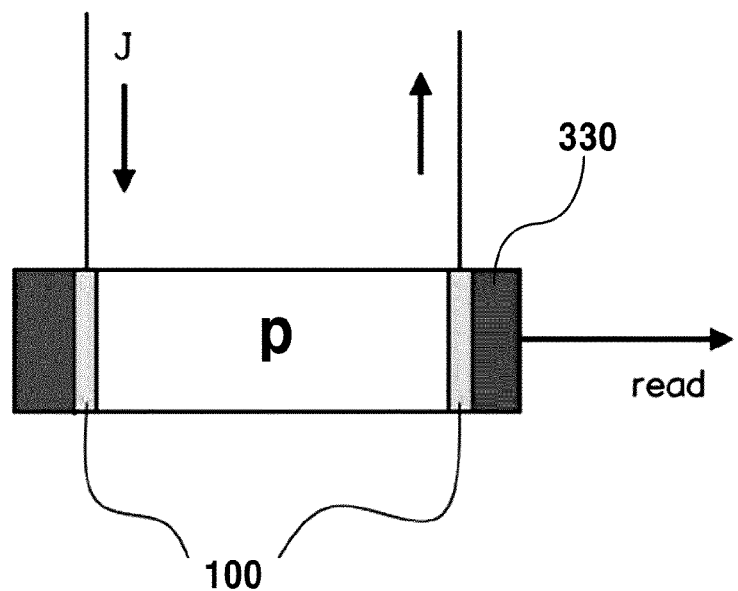
(a)
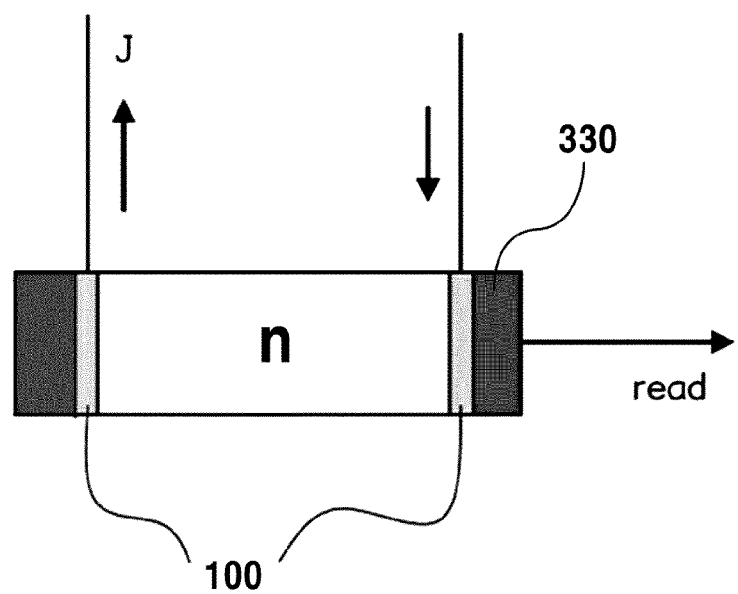
(b)

TEMPERATURE DISCRETIZATION DIGITAL DEVICE

TECHNICAL FIELD

The present invention relates to a temperature discretization digital device and, more particularly, a temperature discretization digital device, which is configured to use a material with a multi-temperature solution as a device to store information according to a physical history, to cause the multi-temperature solution to correspond to an information storage bit value.

BACKGROUND ART

The core of digital technology is to store and compute information into digital bits that have discrete and discontinuous states. The representative bitization technology includes an exponential current amplification technology according to the voltage gate in the transistor invented in the mid-20th century, and a qubit quantum computing-bitization technology using wavefunction entanglement of particles constituting a material.

A digital device based on such a bitization technology in the related art implements information discretization using current, electron, spin, lattice (crystalline/amorphous), and light states.

Since the bitization technology is the most core content of modern technology, it can be an origin for developing new technologies when available bitization technology is developed according to the physical environment.

DISCLOSURE

Technical Problem

The present invention has been made keeping in mind the above problems occurring in the related art, and an objective of the present invention is to provide a temperature discretization digital device capable of achieving a thermalBIT, which controls the characteristic of bifurcation of a temperature solution of a thermo-electric heat equation by adjusting an internal calorific value control parameter such as a current/voltage/thermoelectric property coefficient, so as to cause numbers 0 and 1 to correspond to the numerical range of a temperature solution, for thermoelectric materials or conductive materials.

Technical Solution

In order to achieve the above objectives, the present invention provides a temperature discretization digital device, the device being configured to, for a thermalBIT solution realizing material with multi-temperature solutions in a given range of current or voltage: acquire the multi-temperature solutions by controlling a characteristic of bifurcation of a temperature solution determined through a thermo-electric heat equation by adjusting an internal calorific value control parameter; and implement the thermalBIT by causing numbers 0, 1, 2, . . . , N to correspond to a numerical range of the acquired multi-temperature solutions, wherein the thermo-electric heat equation is as follows:

$$0 = \nabla(k \cdot \nabla T) + [-T \nabla \alpha \cdot J + \rho J^2]$$

where, T is a temperature solution of the thermo-electric heat equation as a temperature distribution function for space; k is a thermal conductivity; α is a Seebeck coefficient; and ρ is an electrical resistivity, and wherein J is an electrical current density and, when a voltage V is applied across the thermalBIT solution realizing material along with an external resistance $R_{ext}$, is expressed as follows:

$$J = \frac{V}{\int \rho dx + R_{ext}/A}$$

where, $R_{ext}$ is an external resistance, and A is a cross-sectional of the thermalBIT element.

In addition, the thermalBIT solution realizing material may be a thermoelectric material.

In addition, the thermalBIT solution realizing material may be such that the thermo-electric heat equation has the multi-temperature solutions with non-local and non-linear properties, due to characteristics of thermo-electric properties changing depending on temperature or position.

In addition, the internal calorific value control parameter may be an electric current density J.

In addition, the internal calorific value control parameter may be a voltage V.

In addition, the internal calorific value control parameter may be an external resistance $R_{ext}$.

In addition, the thermalBIT solution realizing material may be made of PbTe, $BaTiO_3$, GeTe, $Ag_2Te$, $Cu_2Se$, SnSe, or an alloy thereof, and has an electrical resistivity changing rapidly depending on temperature.

In addition, the thermalBIT solution realizing material may be divided into a P-type thermalBIT material in which a Seebeck coefficient α is α>0; and an N-type thermalBIT material in which the Seebeck coefficient α of α<0.

In addition, the temperature discretization digital device may further include electrodes coupled to both ends of the thermalBIT solution realizing material; and a temperature solution acquisition terminal contacting the thermalBIT solution realizing material to acquire thermalBIT temperature information, in which an amount of change in the control parameter may be transmitted through the electrode.

In addition, the thermalBIT solution realizing material may be formed in a structure of m (m=natural number) laminating layers, and the laminating layers have different Seebeck coefficients from each other.

In addition, the thermalBIT solution realizing material may be sequentially laminated with a P-type thermalBIT material in contact with the first electrode; and an N-type thermalBIT material in contact with the second electrode.

In addition, the temperature solution acquisition terminal may contact a center of the thermalBIT solution realizing material to acquire the thermalBIT temperature information.

In addition, the temperature solution acquisition terminal may further include an information layer disposed in the thermalBIT solution realizing material, and contacts the information layer to acquire the thermalBIT temperature information.

In addition, the temperature solution acquisition terminal may contact the first electrode or the second electrode to acquire the thermalBIT temperature information.

In addition, the temperature solution acquisition terminal may further include an information layer connected to an end of the thermalBIT solution realizing material, and contacts the information layer to acquire the thermalBIT temperature information.

In addition, the first electrode or the second electrode may be coupled to a thermal insulating or cooling plate.

In addition, the information layer may have a higher resistivity than that of thermalBIT solution realizing material.

In addition, the information layer may have a lower thermal conductivity than that of the thermalBIT solution realizing material.

Advantageous Effects

The temperature discretization digital device according to the present invention is capable of achieving thermalBIT, thereby making it possible to implement the temperature-bitization technology with which replaces the existing semiconductor-bitization technology and quantum computing-bitization technology.

DESCRIPTION OF DRAWINGS

FIG. 2 is a graph illustrating the hysteresis characteristics according to the bifurcation of temperature solution in FIG. 1.

FIG. 4 is a graph illustrating the change in electrical conductivity according to the temperature of an alloy of PbTe and PbTe.

FIG. 5 illustrates a structure of a thermalBIT device of a single-junction method using PbTe as a single material and a graph of temperature simulation result.

FIG. 7 illustrates a table and a graph of a material whose electrical resistivity changes rapidly with temperature.

FIG. 8 illustrates the temperature (thermal) boundary condition and thermo-electric thermal balance equation of a single material type thermalBIT in a single-junction method.

FIG. 10 is a table illustrating selection of control parameters according to material properties.

FIG. 11 is a graph illustrating the division of a fixed temperature mode and a floating temperature mode according to the temperature resolution generation position of the thermalBIT solution realizing material.

FIG. 12 is a diagram illustrating the structure of a temperature discretization digital device in the fixed temperature mode.

FIG. 13 is a diagram illustrating the structure of a temperature discretization digital device in the floating temperature mode.

BEST MODE

Figure 1:
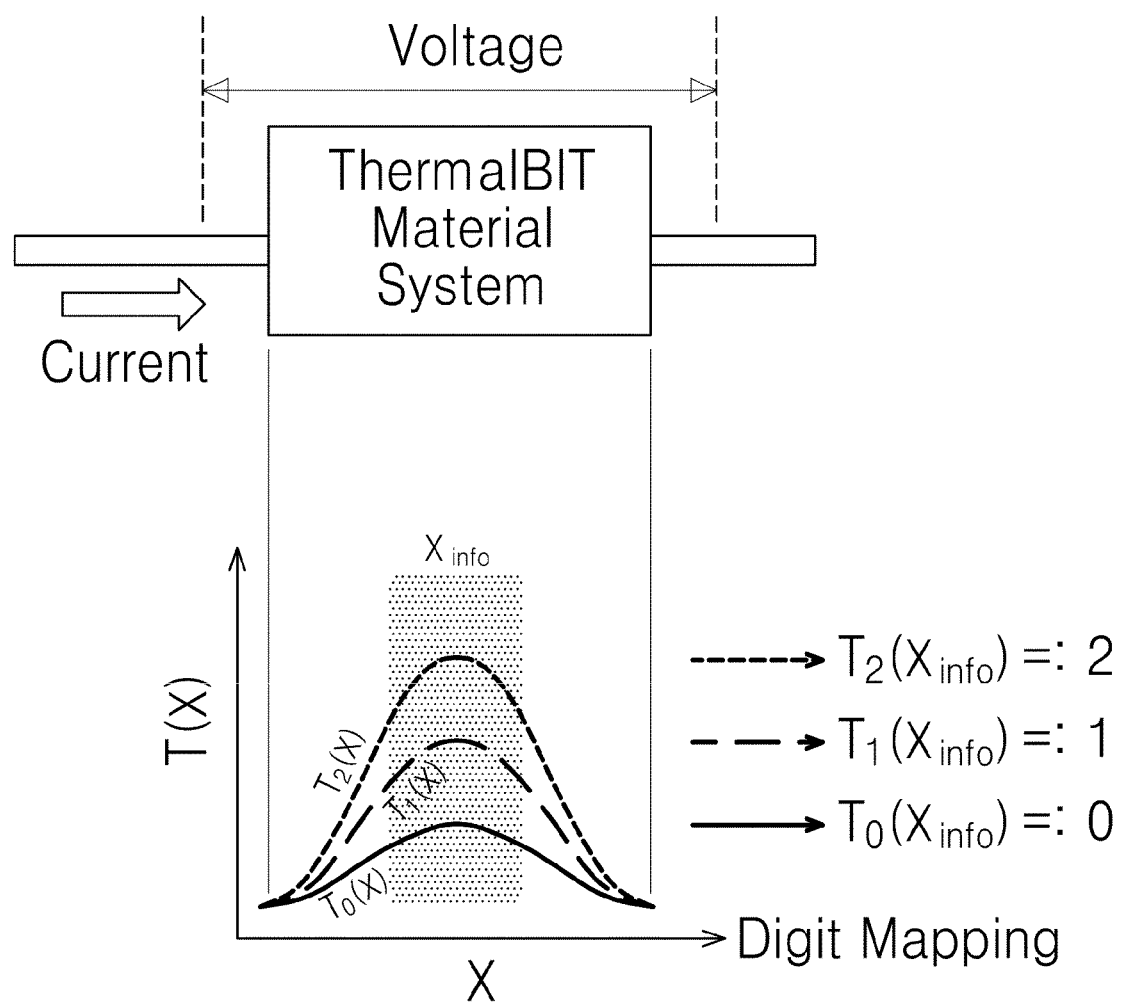
FIG. 1 is a state diagram illustrating a multi-temperature solution generation state compared to the applied power of the thermalBIT solution realizing material used in the present invention.

Hereinafter, some embodiments of the present invention will be described in detail with reference to exemplary drawings. When adding reference numerals to the components of each drawing, it should be noted that the same components have the same reference numerals as much as possible even though they are indicated on different drawings. In addition, when it is determined that a detailed description of a related known configuration or function interferes with the understanding of the embodiment of the present invention in describing an embodiment of the present invention, the detailed description thereof will be omitted.

In addition, when describing the components of the embodiment of the present invention, the terms of first, second, A, B, (a), (b), and the like may be used. These terms are only used to distinguish the component from other components, and the essence, order, or order of the corresponding components is not limited by the terms. When a component is described as "connected", "coupled" or "attached" to another component, it should be understood that the component may be directly connected or connected to the other component, as well as a third component may be "connected", "attached" or "connected" between the components.

The present invention relates to a temperature discretization digital device, which is configured to, for a thermalBIT solution realizing material with a multi-temperature solution in a given range of current or voltage: acquire the multi-temperature solution by controlling a characteristic of bifurcation of a temperature solution determined through a thermo-electric heat equation by adjusting an internal calorific value control parameter; and implement the thermalBIT by causing numbers 0, 1, 2, . . . , N to correspond to the numerical range of the multi-temperature solution.

The thermalBIT solution realizing material is made of a thermalBIT solution realizing material having the multi-temperature solution as shown in FIG. 1 at an intermediate current or voltage in a variably applied range of current or voltage.

Hereinafter, when considering an embodiment referring to FIG. 1 in detail, when current or voltage is applied across the thermalBIT solution realizing material, it can be seen that the temperature solution appears differently in the central point X in the case of the same electrical current density according to the application history.

That is, in FIG. 1, when the same electrical current density J is applied across both ends of the thermalBIT solution realizing material with different application histories, the temperature is measured differently as $T_0$, $T_1$, and $T_2$ values at the center of the thermalBIT solution realizing material depending on the application history.

Hereinafter, the occurrence of such a phenomenon will be described.

The thermalBIT solution realizing material has non-local and non-linear thermoelectric properties depending on temperature and location, thereby making possible to have the multi-temperature solution.

In general, heat has the characteristic of moving from a high temperature to a low temperature through radiation, convection, and conduction, and eventually, thereby obtaining the steady-state temperature distribution.

When there is a heat source inside the material, the temperature may take one or more forms. As a representative heat source in a material, there are an electric Joule heat source and a thermoelectric heat source by a thermo-electric material appearing in the Thomson phenomenon. With the reversible Thomson Heat and irreversible Joule heat generation caused by the thermoelectric phenomenon, the shape of the temperature distribution in the material may be changed. Here, the temperature has a solution according to the thermoelectric heat equation of Equation 1, obtained by modifying the thermal equation.

$$0 = \nabla(k \cdot \nabla T) + [-T\nabla\alpha \cdot J + \rho J^2]$$ [Equation 1]

: thermoelectric heat equation

In the above equation, T is a temperature solution of the thermoelectric heat equation as a temperature distribution function for space; T is a temperature; k is a thermal conductivity; α is a Seebeck coefficient, ρ is an electrical resistivity; and J is an electrical current density.

The first term of the thermoelectric heat equation is a diffusion equation, which causes heat to flow from a high temperature place to a low temperature place to obtain equilibrium temperature distribution.

Here, the heat (second term) appearing in the Thompson phenomenon and the heat (third term) appearing in the Joule heat are controlled through electrical current density. When the current is small, the temperature solution in the material is unique. However, when the current is large and several materials are provided, the temperature solution in the materials may have multiple solutions instead of one solution in the case of the same electrical current density J.

Since the present invention is configured to control the characteristic of bifurcation of temperature solution of the thermoelectric heat equation by adjusting the internal calorific value control parameter, a multi-temperature solution may be obtained as shown in FIG. 1, and thermalBIT may be implemented by causing digital numbers such as 0, 1, and 2 to correspond to the numerical range of the obtained multi-temperature solution.

The adjustment of the internal calorific value control parameter may be performed through electrical current density size control as shown in Equation 1, and may be performed by varying the voltage value applied across both ends of the thermalBIT solution realizing material or the external resistance value connected to the outside, as shown in FIG. 1.

Here, the applied electrical current density J may be expressed in Equation 2 below, when the voltage V is applied across the thermalBIT solution realizing material along with the external resistance $R_{ext}$.

$$J = \frac{V}{\int \rho dx + R_{ext}/A}$$ [Equation 2]

Where, $R_{ext}$ is an external resistance; and A is a cross-sectional area of the thermalBIT element.

Meanwhile, the multi-temperature solution obtained in Equation 1 has a characteristic determined by the history of the applied internal calorific value control parameter.

Hereinafter, in consideration with the characteristic graph according to the bifurcation of temperature solution referring to FIG. 2, when the electrical current density J is applied to both ends of the thermalBIT realizing material, as shown in FIG. 2, if the electrical current density J rises from below $J_0$ to $J_1$, starting from a low electrical current density, the temperature has a characteristic of varying along the $T_0$ temperature curve, and when the electrical current density J goes down from above $J_1$ to $J_0$, starting from high electrical current density, the temperature has a characteristic of varying along the $T_1$ temperature curve.

That is, it may be seen that one of the two temperature values may be selected according to the history of the applied electrical current density between $J_0$ and $J_1$.

In addition, this means that the temperature value between $T_0$ and $T_1$ is the unstable region between $J_0$ and $J_1$, so that it has a tendency to shift to the $T_0$ or $T_1$ curve, which is the stable region.

Further, in FIG. 2, when electrical current density J rises from lower than $J_0$ to higher than $J_1$, the temperature changes along the $T_0$ temperature curve and then discontinuously changes to the $T_1$ temperature curve, and when electrical current density J descends from higher than $J_1$ to lower than $J_0$, the temperature discontinuously changes to the $T_0$ temperature curve, resulting in there is a hysteresis phenomenon.

According to this phenomenon, the applied electrical current density between $J_0$ and $J_1$ may be a physical value that maintains the $T_0$ or $T_1$ temperature value, and an electrical current density pulse having a value less than or equal to $J_0$ or greater than or equal to $J_1$ may be used as a physical value for selecting a $T_0$ or $T_1$ temperature value.

Figure 3:
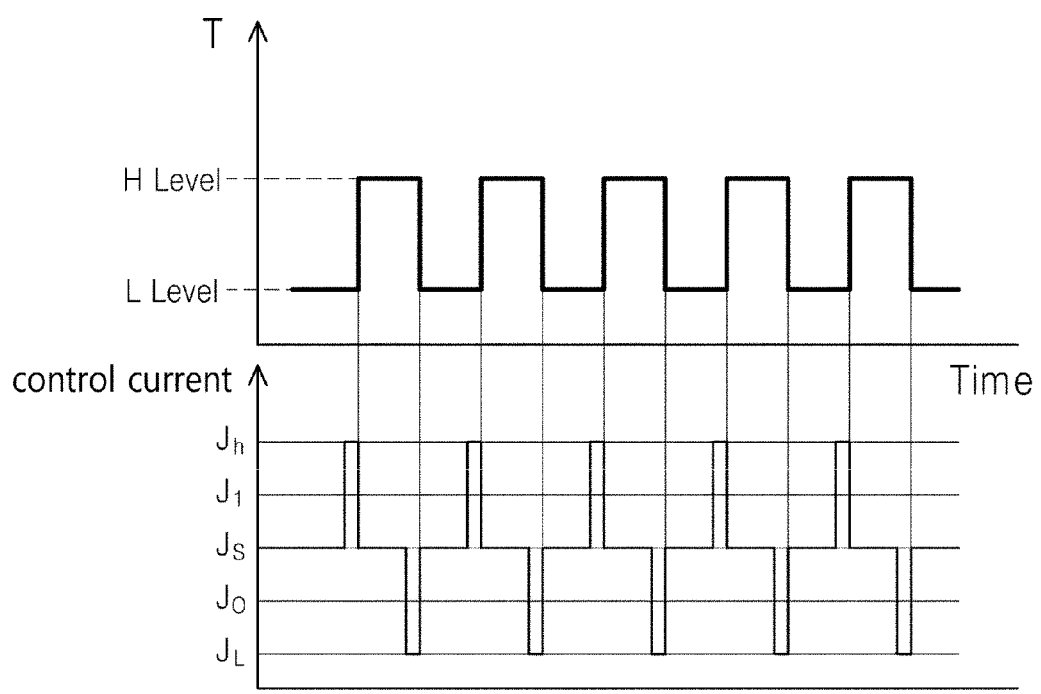
FIG. 3 is a graph illustrating thermalBIT operation using the hysteresis characteristics of temperature solution in FIG. 2.

Therefore, as shown in FIG. 3, the $T_0$ or $T_1$ temperature value may be used as a discretization bit signal by applying a pulse signal having a value less than or equal to $J_0$ or greater than or equal to $J_1$.

Hereinafter, the thermalBIT solution realizing material used in the present invention will be described.

According to the present invention, various materials exhibiting thermoelectric properties may be used as a thermalBIT solution realizing material.

As an embodiment, a PbTe material will be described referring to FIG. 4 (by (a) of FIG. 1, Biswas et al., Nature Chemistry 3, 160 (2011).)

It can be seen that the PbTe material has a characteristic that the specific resistance rapidly varies according to the temperature as shown in (a) of FIG. 4, and an alloy using the PbTe material as the main material has the same and similar properties as shown in (b) of FIG. 4.

Therefore, in the following description, the description of the PbTe material is also applied to the alloy based on PbTe.

As shown in (a) of FIG. 5, in a state that one side of the thermoelectric material made of the PbTe material is thermally insulated and the other side thereof is exposed to room temperature, when an electric current is applied to a substance, a result may be obtained as shown in (b) and (c) of FIG. 5.

Since heat is transferred from the inside of the material to the outside as shown in (a) of FIG. 5, there are two temperature solutions for the same current as shown in (b) of FIG. 5 when simulating with the boundary conditions, and the temperature hysteresis curve is obtained as shown in FIG. 5(c), it was confirmed that it may be used as a device material for thermalBIT.

Figure 6:
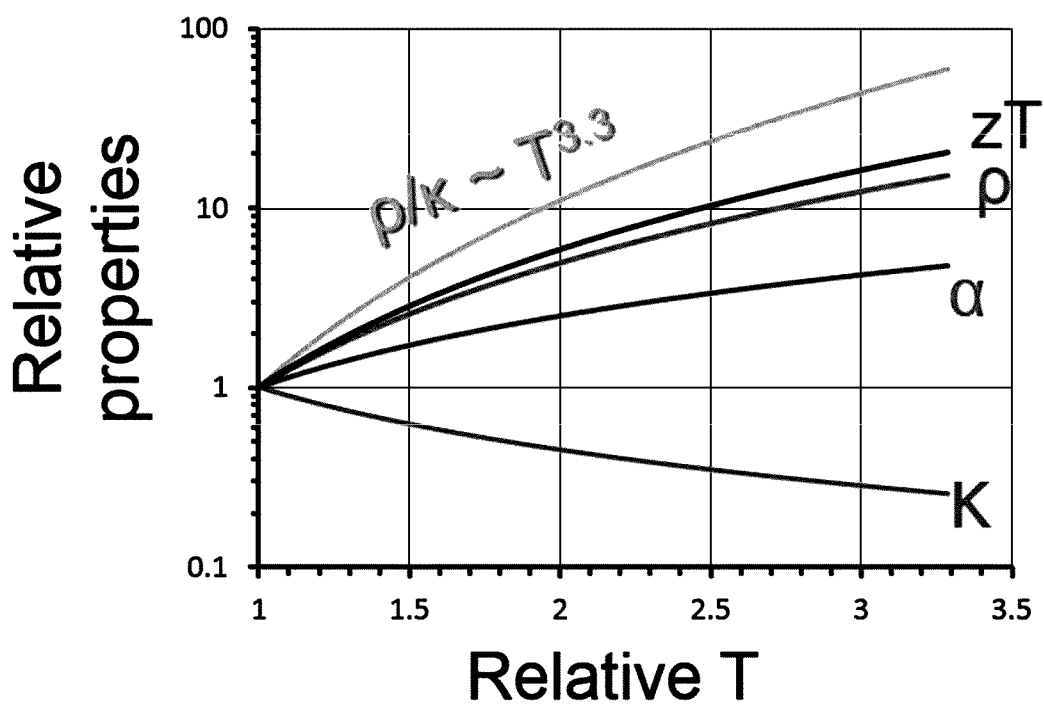
FIG. 6 is a graph illustrating the change in a thermoelectric property state according to the temperature of PbTe, which is a representative thermoelectric material.

In addition to the PbTe material, a material whose resistance changes rapidly with respect to temperature may be used as a device material for thermalBIT, as shown in FIGS. 6 and 7.

For example, in the case of a thermoelectric material, since the resistance changes rapidly depending on the temperature as shown in FIG. 6. it is very suitable as a thermal BIT material.

In addition, as shown in FIG. 7, since materials such as $BaTiO_3$, GeTe, and $Ag_2Te$ undergo a phase transition as the temperature changes, and therefore the resistance changes rapidly, it is suitable as a thermal BIT material.

Figure 9:
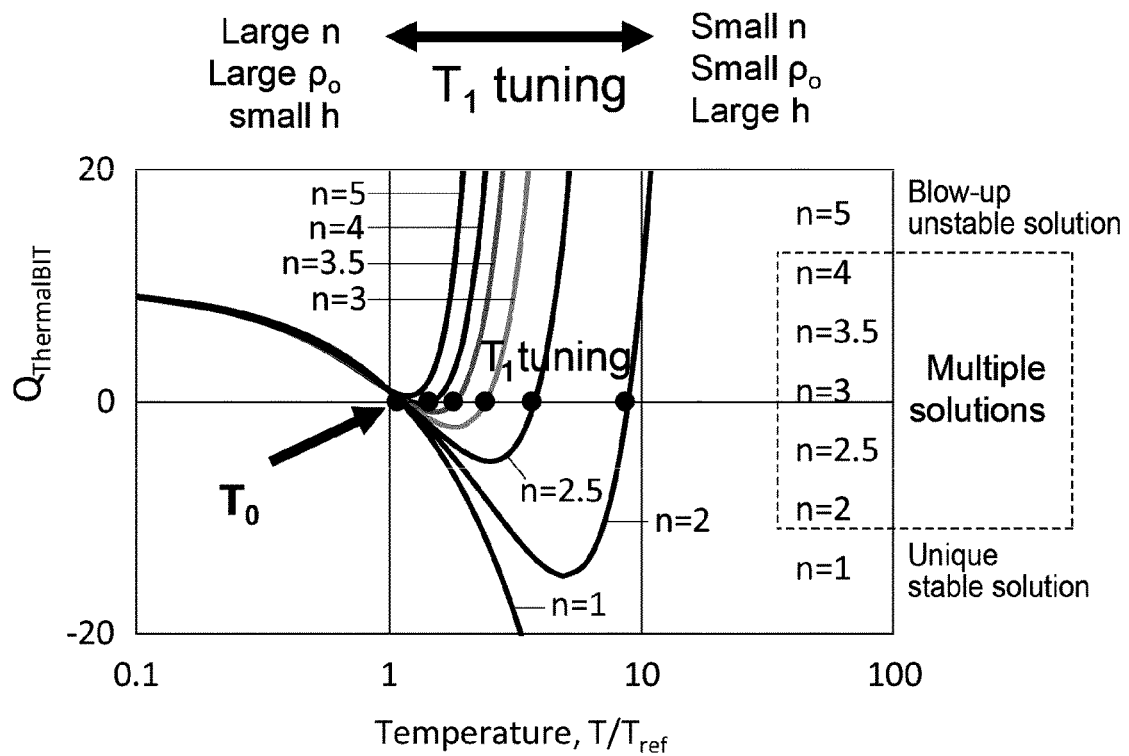
FIG. 9 is a graph illustrating the change in the multi-temperature solution according to the resistivity and cooling parameters in FIG. 8.

Meanwhile, when the thermalBIT material is composed of a single material as shown in (a) of FIG. 5, and the thermoelectric heat equation with respect to it is obtained, it can be approximated as shown in FIG. 8, and the change in the temperature solution for the change in each of parameters (n, $\rho_0$, h) is obtained as shown in FIG. 9.

When the electrical resistivity p in FIG. 8 is expressed as a prefactor $\rho_0$ and a temperature exponent n, it may be expressed as $\rho(T)=\rho_0 T^n$.

In addition, a heat amount $Q_{ThermalBIT}$ generated in the thermoelectric material is determined by Thomson Heat ($Q_{Thompson}=T(d\alpha/dT)(dT/dx)J$) and heat ($Q_{Joule}=\rho J^2$) generated by Joule heat, and air cooling, and has a temperature solution whose value is zero.

Here, when the cooling level of the air is expressed by the convection heat transfer coefficient h and the temperature $T_{ref}$ of the air, the total amount of heat generated by a single material type thermalBIT device may be written:

$$Q_{thermalBIT} = Q_{Thomson} + Q_{Joule} + Q_{cooling} =$$
$$T\left(\frac{d\alpha}{dT}\right)\left(\frac{dT}{dx}\right)J + L\rho_0 T^n J^2 - h(T - T_{ref})$$
[Equation 3]

Where, T is a temperature, k is a thermal conductivity, $\alpha$ is a Seebeck coefficient, $\rho$ is an electrical resistivity, J is an electrical current density.

FIG. 9 is a temperature solution graph according to parameters resistivity prefactor $\rho_0$, resistivity temperature exponent n, and convection heat transfer coefficient h, with respect to the thermoelectric thermal balance equation of a following simplified Equation 4:

$Q_{thermalBIT}= Q_{Joule}+ Q_{cooling}=L\rho_0 T^n J^2-h(T-T_{ref})$  [Equation 4]

without Thomson Heat.

A heat amount $Q_{TE}$ generated in a thermoelectric material is as follows:

$Q_{TE}= Q_{Joule}=L\rho_0 T^n J^2$.

Since cooling $Q_{cooling}$ in a position where the thermoelectric material and air come in contact is as follows:

$Q_{cooling}=-A\ h(T-T_{air})$, a temperature of air is $T_{ref}=T_{air}$, and A is a cross-sectional area, the thermal balance Equation 4 is derived as follows:

$Q_{thermalBIT}= Q_{TE}+ Q_{cooling}=L\rho_0 T^n J^2-h(T-T_{ref})$ for a unit area.

When the temperature inside the thermoelectric material is assumed to be constant, temperature solution equation (sum of Q values, i.e., $Q_{ThermalBIT}$ is 0)

$0=L\rho_0 T^n J^2 h(T-T_{ref})$ may be obtained.

For simplicity, considering when n=2, it is as follows:

$$\left(\frac{L\rho_0 J^2}{h}\right)T^2 - T + T_{air} = 0.$$

The number of solutions (the number of temperature solutions) of the above quadratic equation may be determined by a discriminant that is a relationship between coefficients.

$$D = 1 - 4\left(\frac{L\rho_0 J^2}{h}\right) \cdot T_{air} > 0:$$

two solutions (one stable solution, and one unstable solution)

$$D = 1 - 4\left(\frac{L\rho_0 J^2}{h}\right) \cdot T_{air} = 0:$$

one solution (one unstable solution)

$$D = 1 - 4\left(\frac{L\rho_0 J^2}{h}\right) \cdot T_{air} < 0:$$

no solution, and the temperature is always increasing.

Where, V is a voltage, J is an electrical current density,
L is a length of thermoelectric material, A is an area of thermoelectric material,
and h is convection heat transfer coefficient of air That is, as shown in FIG. 9, it may be seen that there is an additional multi-temperature solution $T_1$ in which position varies according to the amount of change of $\rho_0$, n, h, and J, while having the basic solution of $T_0$ from the thermoelectric heat equation $Q_{ThermalBIT}$ of Equation 4.

When the characteristic of FIG. 9 is utilized, the most desirable control parameters may be selected for the material having unique characteristics as shown in FIG. 10.

For example, an unstable solution may be created by using a thermoelectric material with high resistance but low thermal conductivity, by controlling a different rate of cooling level for air convection, or by using a composite mixed with an insulator as a thermoelectric material to make the resistivity prefactor value larger.

According to these results, multi-temperature solutions can be obtained by using the property of rapidly changing electrical resistivity according to temperature, that is, by using the thermalBIT solution realizing material according to the present invention that is made of $BaTiO_2$, GeTe, $Ag_2Te$, $Cu_2Se$, SnSe or an alloy thereof.

Hereinafter, the temperature discretization digital device 400 according to an embodiment of the present invention will be described.

As shown in FIG. 1 and Equation 1, the thermoelectric heat equation of the temperature discretization device of the present invention is a function of position X. When current is applied to both sides of the thermalBIT solution realizing material as shown in (a) of FIG. 11, a difference in values of the multi-temperature solution is greatest in the middle part, as shown in (b) of FIG. 11, and the difference in the values of the multi-temperature solution may be expressed as resolution of the temperature solution.

Here, the multi-temperature solution value is not necessarily formed only in the center of the thermalBIT solution realizing material, but formed at one end as shown in the example of the above-described thermoelectric material in (c) of FIG. 11.

Hereinafter, for explanation of the present invention, it is considered that the state (b) of FIG. 11 is referred to as a fixed temperature mode, and the state (c) of FIG. 11 is referred to as a floating temperature mode.

It can be seen that a multi-temperature solution value with a temperature solution resolution $\Delta T(X1)$ may be obtained from the center X1 of the thermalBIT solution realizing material and used as a discretization signal in (b) of FIG. 11, and a multi-temperature solution value having a temperature solution resolution $\Delta T(X2)$ may be obtained from one end X2 of the thermalBIT solution realizing material and used as a discretization signal in (c) of FIG. 11.

The floating temperature mode as shown in (c) of FIG. 11 mainly occurs when a thermoelectric semiconductor device having a large specific resistance change and a large Thomson thermal change according to temperature is used as a thermalBIT solution realizing material.

The present invention may be configured so that electrodes are formed on both ends of the thermalBIT solution realizing material to apply an electric current to use the multi-temperature solution value in the fixed temperature mode and the floating temperature mode, and the thermalBIT solution realizing material further includes a temperature solution acquisition terminal to acquire thermalBIT temperature information.

The temperature solution acquisition terminal may use a temperature sensor that varies a temperature value into an electrical signal and then acquires it, and the control parameter that is available to acquire the multi-temperature solution through the electrode may be electrical current density, voltage, or external resistance.

Here, the formation position of the temperature solution acquisition terminal varies depending on the thermalBIT solution realizing material having the fixed temperature mode of (b) of FIG. 11 and the floating temperature mode of (c) of FIG. 11.

That is, considering the fixed temperature mode according to an embodiment, referring to (b) of FIG. 11, the temperature solution acquisition terminal is preferably in contact with the central portion of the thermalBIT solution realizing material to acquire thermalBIT temperature information, as shown in (a) of FIG. 12

In addition, it is considered that an information layer is disposed in the thermalBIT solution realizing material and the temperature solution acquisition terminal is coupled to the information layer, as shown in (b) of FIG. 12.

In the case of the floating temperature mode, the temperature solution acquisition terminal may contact the center of the thermalBIT solution realizing material, and selectively the one end of the thermalBIT solution realizing material depending on the temperature solution resolution as shown in (a) and (b) of FIG. 13, to acquire the thermalBIT temperature information.

When the temperature solution acquisition terminal is formed at one end in the floating temperature mode as shown in FIG. 13, the information layer is coupled to one end, and the temperature solution acquisition terminal is coupled to the information layer.

Meanwhile, the thermalBIT solution realizing material is formed in a structure of m (m=natural number) laminating layers, and the laminating layers have different Seebeck coefficients from each other, if any.

It means that in the case of m=1, only one type of thermalBIT solution realizing material is formed, and in the case of m=2 or more, different types of thermalBIT solution realizing materials with different Seebeck coefficients are laminated next to each other. In addition, it means that it is not necessarily limited to the different types of thermalBIT solution realizing materials having m different Seebeck coefficients, and two types of thermalBIT solution realizing materials having two different Seebeck coefficients may be alternately laminated.

To the laminating structure of the thermalBIT solution realizing material, since the Peltier heat transfer at the interface between the segmented materials helps to quickly redistribute the internal temperature according to the change in current while increasing the possibility of generating an multi-temperature solution, and to rapidly transition to different multi-temperature solutions, there are advantages of increasing the probability of occurrence of a multi-temperature solution, and maximizing the temperature solution resolution.

This is also available in the thermalBIT solution realizing material bonded to both sides of the information layer in a structure such as in (b) of FIG. 12, in which the effect is as if the same type of thermalBIT solution realizing material has effect as being multi-layered by the information layer.

Meanwhile, the thermalBIT solution realizing material may be divided into a P-type thermalBIT material having a Seebeck coefficient $\alpha$ of $\alpha>0$ and an N-type thermalBIT material having a Seebeck coefficient $\alpha$ of $\alpha<0$. Here, the thermalBIT solution realizing material may be formed by sequentially laminating the P-type thermalBIT material in contact with the first electrode and the N-type thermalBIT material in contact with the second electrode.

The P-type thermalBIT material and the N-type thermalBIT material are to distinguish the thermoelectric material in which the direction of the thermoelectric effect is determined according to the direction of the current, and separately described for the characteristics of the present invention.

When applying a current in a direction shown in (a) of FIG. 13 in the case of P-type thermalBIT material, and applying a current in a direction shown in (b) of FIG. 13 in the case of N-type thermalBIT material, such current directions make it possible to use the interfacial Peltier heat, thereby increasing the temperature resolution.

Figure 14:
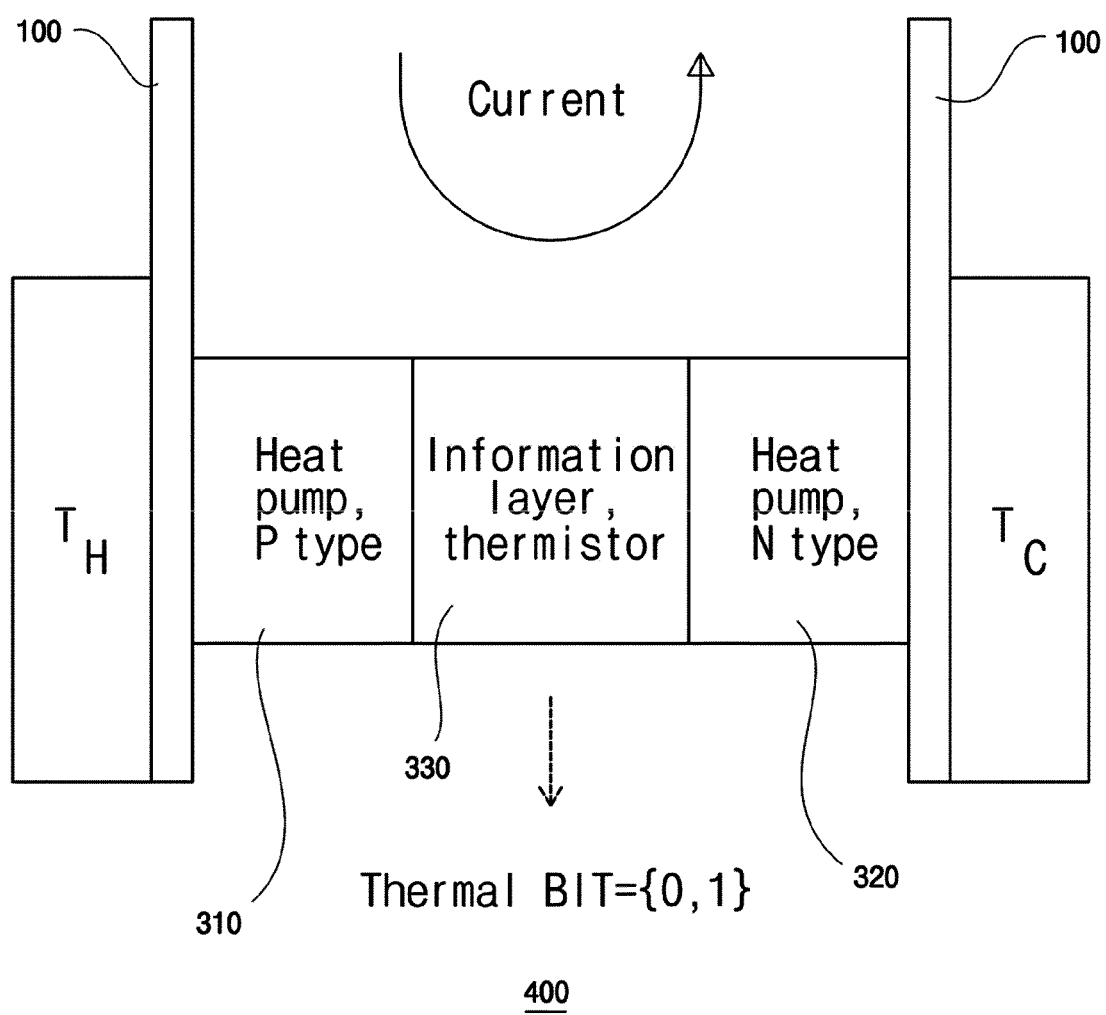
FIG. 14 is a diagram illustrating a stack type temperature discretization digital device structure.

Meanwhile, as shown in FIG. 14, when the P-type thermalBIT material and the N-type thermalBIT material are sequentially formed between the electrodes, the resolution of the temperature solution may be increased at the center and the temperature solution transition may be made faster by the Peltier heat transfer at the interface between the segmented materials.

Here, when inserting the information layer between the P-type thermalBIT material and the N-type thermalBIT material, P-N junctions are made on both sides of the information layer, as in the structure of (b) of FIG. 12, thereby increasing the resolution of the temperature solution.

In (b) of FIG. 12, when N type is on the left and P type is on the right, and the current flows from P to N, heat is generated at the point where the Seebeck coefficient is varied due to the difference in Peltier heat transfer value.

Therefore, in the case of a P-info-N structure (info: information layer) as shown in (b) of FIG. 12, heat builds up in the information layer, resulting in raising the temperature.

That is, a temperature distribution of a concave curve may be made due to heat generation by Joule heat of the material, as well as P-N junction makes it possible to increase the amount of heat generated at the interface and also increase the resolution of the temperature solution.

To summarize, there are two methods, one that makes the Seebeck coefficient difference, and the other that generates Joule heat, as a method to make the multi-temperature solution in thermalBIT. Although Joule heat may be used in the case of single layer structure, in the case of multiple layers, not only Joule heat but also Peltier heat at the interface can be accumulated or removed to increase the temperature solution resolution.

In the case of a P-N junction structure, when J is changed, temperature redistribution occurs. When stacked in the form of P-info-N, the Peltier heat transfer is faster than the general heat diffusion (heat conduction phenomenon) in the information layer, whereby there is an advantage in that the response time of the device may be increased.

As a layered material of the information layer, for acquiring and transmitting thermal information of a formation location, it is preferable to use a conductive material that generates large Joule heat with respect to current and has low thermal conductivity.

In this case, the generated Joule heat leads to an additional temperature rise, whereby there is an advantage that the resolution of the temperature solution can be further increased.

For this purpose, it can be considered to reduce the charge doping on the information layer to have a higher resistivity than the P-type and N-type thermalBIT materials on both sides. Therefore, since the charge density is small and the conductivity is small, the thermal conductivity generated through electrons may decrease, and thus the thermal conductivity may decrease.

In the case of the temperature discretization digital device described above according to the present invention, the first electrode or the second electrode as needed is thermally insulated, or electrode high or low temperatures is bonded to form a fixed temperature boundary condition, thereby increasing the resolution of the temperature solution.

FIG. 14 relates to such an embodiment, but the present invention is not limited thereto.

Although certain embodiments for implementing the temperature discretization digital device have been described in the detailed description, it is noted that the present invention may be not limited thereto, but modified in various forms, as long as those of ordinary skill in the art to which the present invention pertains can implement various changes without departing from the scope of the present invention.

The invention claimed is:

1. A temperature discretization digital device, the device being configured to, for a thermalBIT solution realizing material with multi-temperature solutions in a given range of current or voltage:
   acquire the multi-temperature solutions by controlling a characteristic of bifurcation of a temperature solution determined through a thermoelectric heat equation by adjusting an internal calorific value control parameter; and
   implement the thermalBIT by causing numbers 0, 1, 2, . . . , N to correspond to a numerical range of the acquired multi-temperature solutions,
   wherein the thermoelectric heat equation is as follows:

$$0=\nabla(k \cdot \nabla T)+[-T\nabla\alpha \cdot J+\rho J^2]$$

where, T is a temperature solution of the thermoelectric heat equation as a temperature distribution function for space; k is a thermal conductivity; $\alpha$ is a Seebeck coefficient; and $\rho$ is an electrical resistivity, and
   wherein J is an electrical current density and, when a voltage V is applied across the thermalBIT solution realizing material along with an external resistance $R_{ext}$, is expressed as follows:

$$J = \frac{V}{\int \rho dx + R_{ext}/A}$$

where, $R_{ext}$ is an external resistance, and A is a cross-sectional of the thermalBIT element.

2. The temperature discretization digital device of claim 1, wherein the thermalBIT solution realizing material is a thermoelectric material.

3. The temperature discretization digital device of claim 1, wherein the thermalBIT solution realizing material is such that the thermoelectric heat equation has the multi-temperature solutions with non-local and non-linear properties, due to characteristics of thermoelectric properties changing depending on temperature or location.

4. The temperature discretization digital device of claim 1, wherein the internal calorific value control parameter is an electric current density J.

5. The temperature discretization digital device of claim 1, wherein the internal calorific value control parameter is a voltage V.

6. The temperature discretization digital device of claim 1, wherein the internal calorific value control parameter is an external resistance $R_{ext}$.

7. The temperature discretization digital device of claim 1, wherein the thermalBIT solution realizing material is made of PbTe, $BaTiO_3$, GeTe, $Ag_2Te$, $Cu_2Se$, SnSe, or an alloy thereof, and has an electrical resistivity changing rapidly depending on temperature.

8. The temperature discretization digital device of claim 1, wherein the thermalBIT solution realizing material is divided into a P-type thermalBIT material in which a Seebeck coefficient $\alpha$ is $\alpha>0$; and an N-type thermalBIT material in which the Seebeck coefficient $\alpha$ of $\alpha<0$.

9. The temperature discretization digital device of claim 1, further comprising:
   electrodes coupled to both ends of the thermalBIT solution realizing material; and
   a temperature solution acquisition terminal contacting the thermalBIT solution realizing material to acquire thermalBIT temperature information,
   wherein an amount of change in the control parameter is transmitted through the electrode.

10. The temperature discretization digital device of claim 9, wherein the thermalBIT solution realizing material is formed in a structure of m (m=natural number) laminating layers, and the laminating layers have different Seebeck coefficients from each other.

11. The temperature discretization digital device of claim 10, wherein the thermalBIT solution realizing material is sequentially laminated with
   a P-type thermalBIT material in contact with the first electrode; and
   an N-type thermalBIT material in contact with the second electrode.

12. The temperature discretization digital device of any one of claims 9 to 11, wherein the temperature solution acquisition terminal contacts a center of the thermalBIT solution realizing material to acquire the thermalBIT temperature information.

13. The temperature discretization digital device of claim 12, wherein the temperature solution acquisition terminal further comprises an information layer disposed in the thermalBIT solution realizing material, and contacts the information layer to acquire the thermalBIT temperature information.

14. The temperature discretization digital device of any one of claims 9 to 11, wherein the temperature solution acquisition terminal contacts the first electrode or the second electrode to acquire the thermalBIT temperature information.

15. The temperature discretization digital device of claim 12, wherein the temperature solution acquisition terminal further comprises an information layer connected to an end of the thermalBIT solution realizing material, and contacts the information layer to acquire the thermalBIT temperature information.

16. The temperature discretization digital device of claim 9, wherein the first electrode or the second electrode is coupled to a thermal insulating or cooling plate.

17. The temperature discretization digital device of claim 13 or claim 15, wherein the information layer has a higher resistivity than that of thermalBIT solution realizing material.

18. The temperature discretization digital device of claim 13 or claim 15, wherein the information layer has a lower thermal conductivity than that of the thermalBIT solution realizing material.

* * * * *